United States Patent [19]

Apps

[11] Patent Number: 5,060,819
[45] Date of Patent: Oct. 29, 1991

[54] NESTABLE LOW DEPTH TRAY

[75] Inventor: William P. Apps, Anaheim, Calif.

[73] Assignee: Rehrig-Pacific Company, Inc., Los Angeles, Calif.

[21] Appl. No.: 424,163

[22] Filed: Oct. 20, 1989

Related U.S. Application Data

[63] Continuation-in-part of Ser. No. 186,140, Apr. 26, 1988, Pat. No. 4,899,874, and a continuation-in-part of Ser. No. 272,039, Nov. 15, 1988, Pat. No. 4,932,532, and a continuation-in-part of Ser. No. 369,598, Jun. 21, 1989.

[51] Int. Cl.⁵ ............................................. B65D 75/00
[52] U.S. Cl. .................................... 220/519; 220/516; 206/203; 206/503; 206/509; 206/511
[58] Field of Search ............... 206/203, 499, 503, 509, 206/512, 515, 516, 518, 821, 507, 511; 220/509, 516, 519

[56] References Cited

U.S. PATENT DOCUMENTS

| | | |
|---|---|---|
| D. 98,200 | 1/1936 | Worthington . |
| 2,146,925 | 2/1939 | Ahrbecker et al. . |
| 2,777,597 | 1/1957 | Ruff .................................... 206/509 |
| 3,009,579 | 11/1961 | Ettlinger, Jr. ........................ 206/203 |
| 3,052,373 | 9/1962 | Frater . |
| 3,265,237 | 8/1966 | Pache et al. . |
| 3,270,913 | 9/1966 | Bridenstine et al. . |
| 3,332,574 | 7/1967 | Earp .................................... 206/503 |
| 3,349,943 | 10/1967 | Box ..................................... 206/509 |
| 3,481,502 | 12/1969 | Slayman ............................. 206/511 |
| 3,616,943 | 11/1971 | Brink .................................. 206/511 |
| 3,744,707 | 7/1973 | Ross . |
| 3,791,549 | 2/1974 | Delbrouck et al. ................. 206/509 |
| 3,794,208 | 2/1974 | Roush et al. ....................... 206/518 |
| 3,902,599 | 9/1975 | Stromberg . |
| 3,907,111 | 9/1975 | Levenhagen . |
| 4,011,948 | 3/1977 | Rehrig et al. ....................... 206/507 |
| 4,095,720 | 6/1978 | Delbrouck et al. . |
| 4,098,403 | 7/1978 | Davis .................................. 206/203 |
| 4,256,224 | 3/1981 | Hirota ................................. 206/518 |
| 4,319,685 | 3/1982 | David .................................. 206/509 |
| 4,364,477 | 12/1982 | Stromberg . |
| 4,410,099 | 10/1983 | de Larosieve . |
| 4,440,303 | 4/1984 | Seager . |
| 4,655,360 | 4/1987 | Tuhanson . |
| 4,773,554 | 9/1988 | Warwick . |
| 4,838,419 | 6/1989 | Weits et al. ........................ 206/503 |
| 4,899,874 | 2/1990 | Apps et al. ......................... 206/201 |
| 4,932,532 | 6/1990 | Apps et al. ......................... 206/503 |

FOREIGN PATENT DOCUMENTS

| | | |
|---|---|---|
| 2712748 | 3/1977 | Fed. Rep. of Germany . |
| 2801077 | 7/1978 | Fed. Rep. of Germany ...... 206/518 |
| 1224622 | 6/1960 | France ................................ 206/503 |
| 1351218 | 6/1964 | France ................................ 206/503 |
| 725683 | 11/1966 | Italy ................................... 206/507 |

Primary Examiner—David T. Fidei
Attorney, Agent, or Firm—Banner, Birch, McKie & Beckett

[57] ABSTRACT

A sturdy, reusable plastic low-depth tray suitable for transporting, storing and displaying sixteen-ounce bottles or other beverage containers. The low-depth, vertical sidewall thereof is molded with, to and about the outside rectangular perimeter of the open gridwork tray floor. The sidewall is free standing and unsupported throughout its height above the floor and is defined by a series of adjacent upright panels, alternating ones of which are raised such that their lower surfaces are spaced above the top of the floor. The top and bottom edges of the sidewall thereby have undulating configurations. An outwardly-disposed support lip extends along the entire length of the top edge, and the raised portions of the bottom edge are spaced above the top of the floor. This sidewall construction allows the trays to securely and compactly column nest when empty and to more fully display the bottles therein and their labels when the trays are loaded and stacked in a low-depth arrangement.

35 Claims, 18 Drawing Sheets

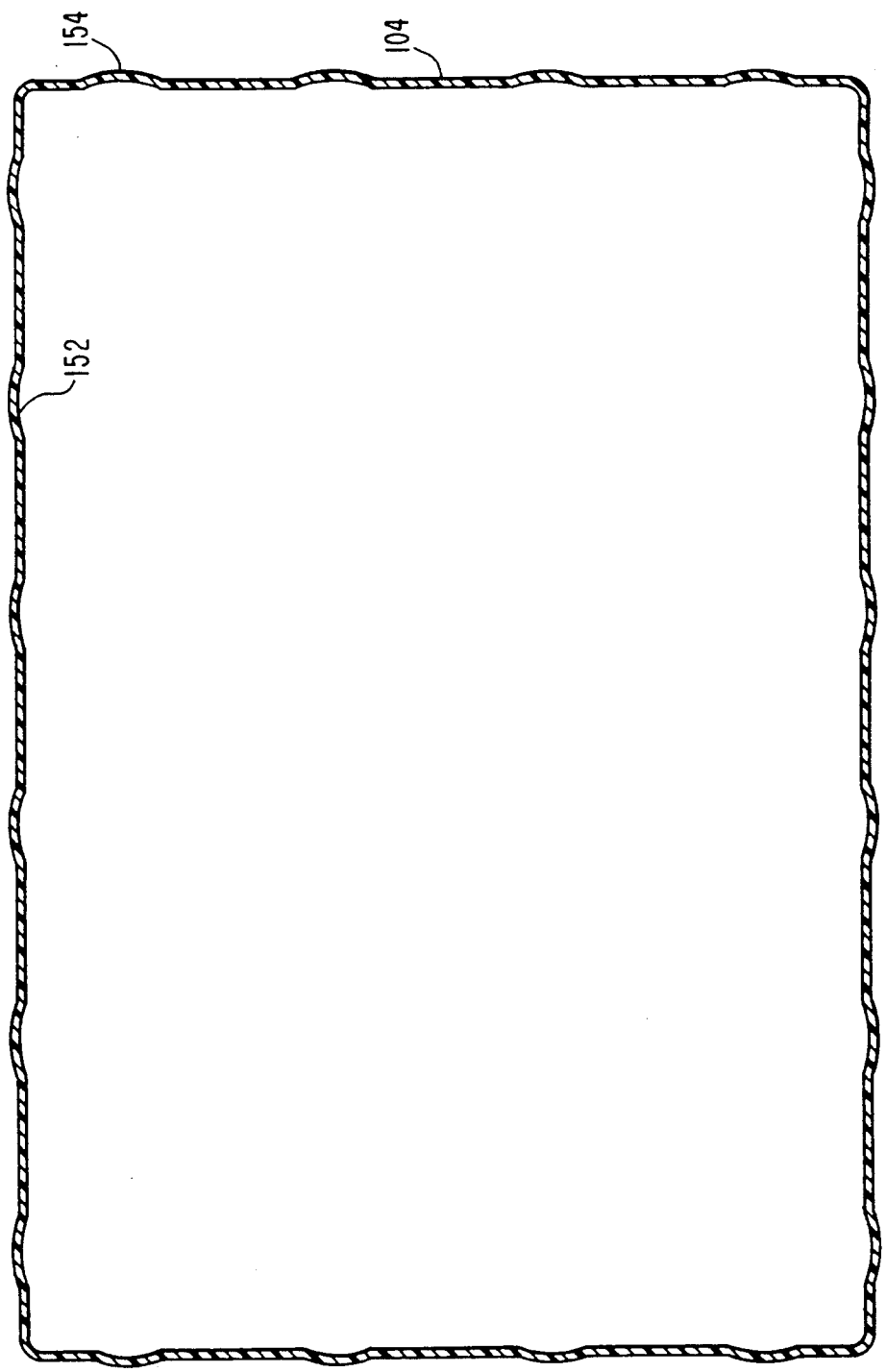

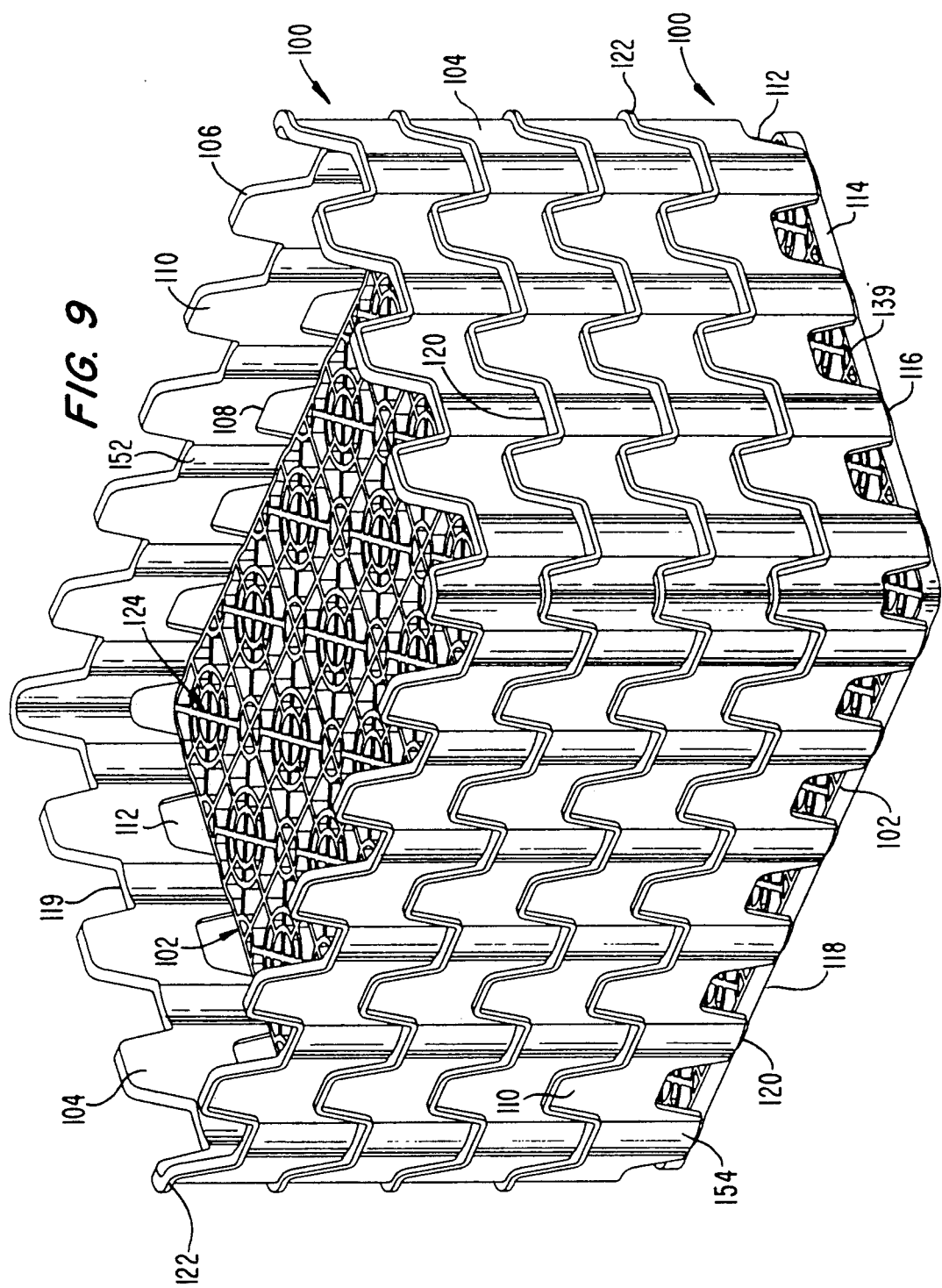

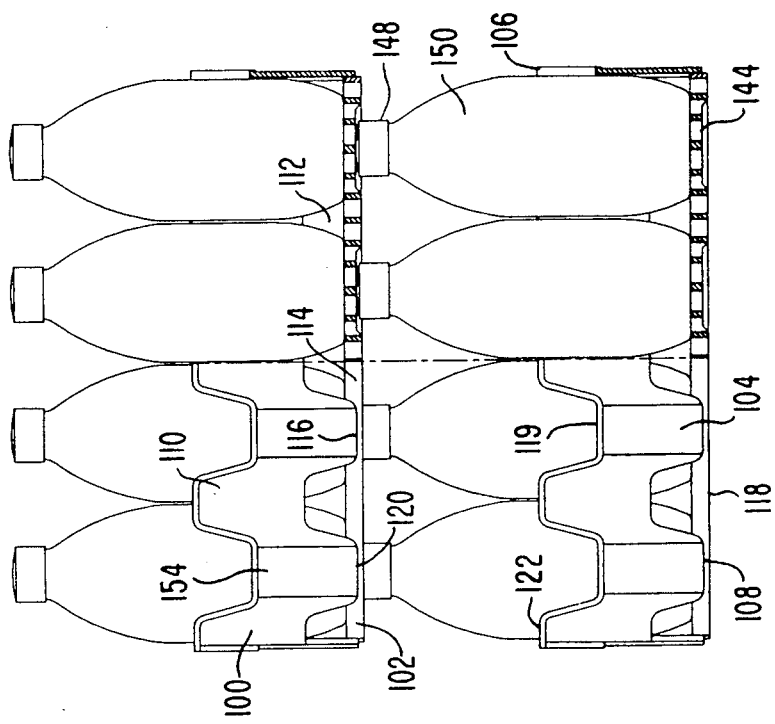
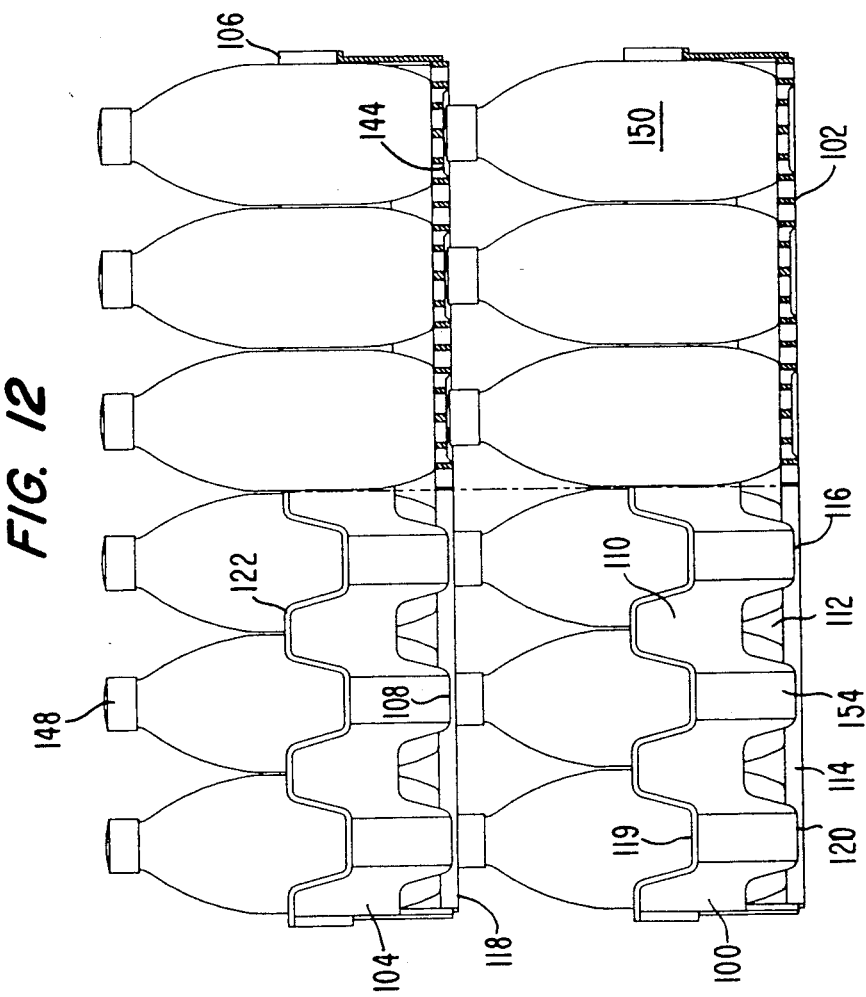

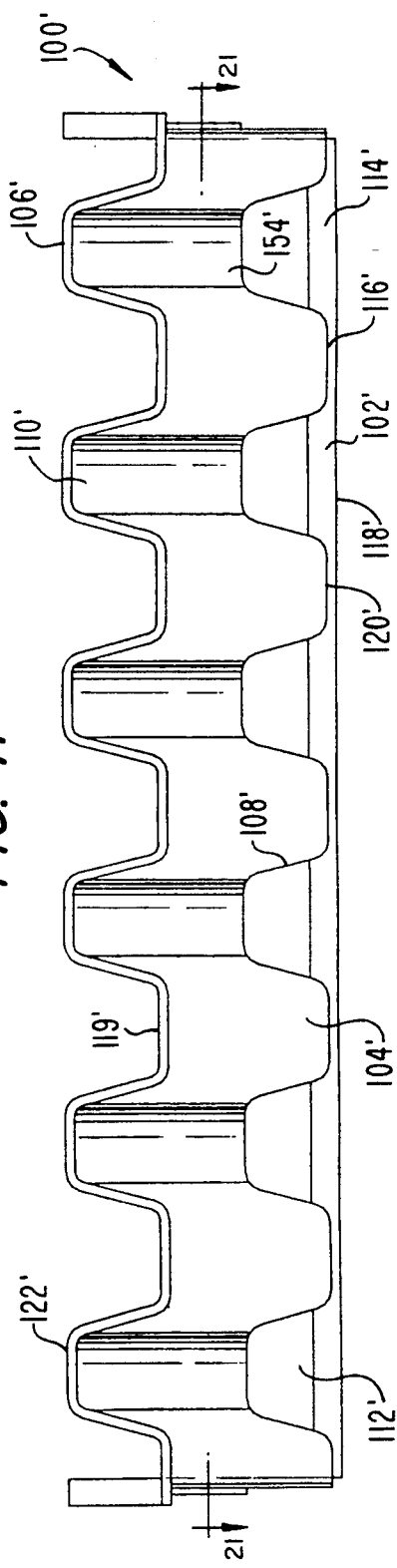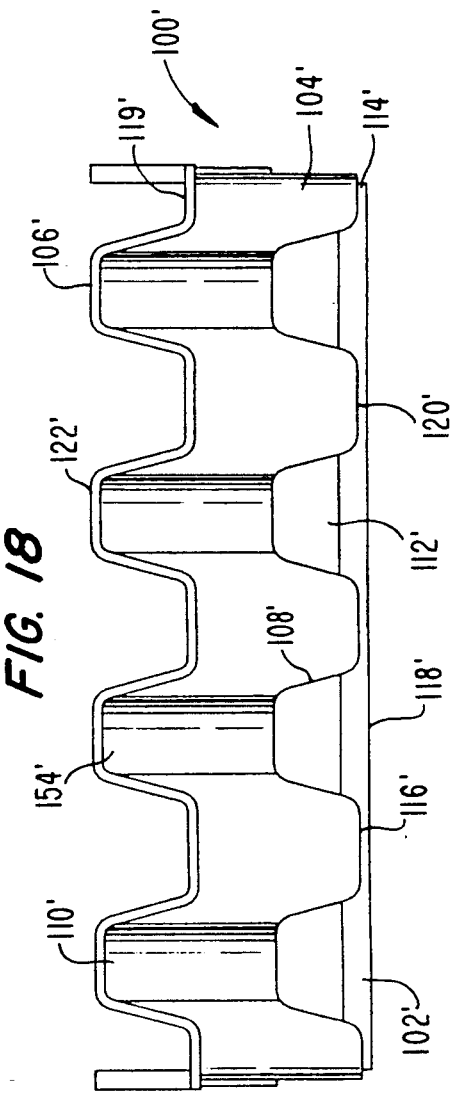

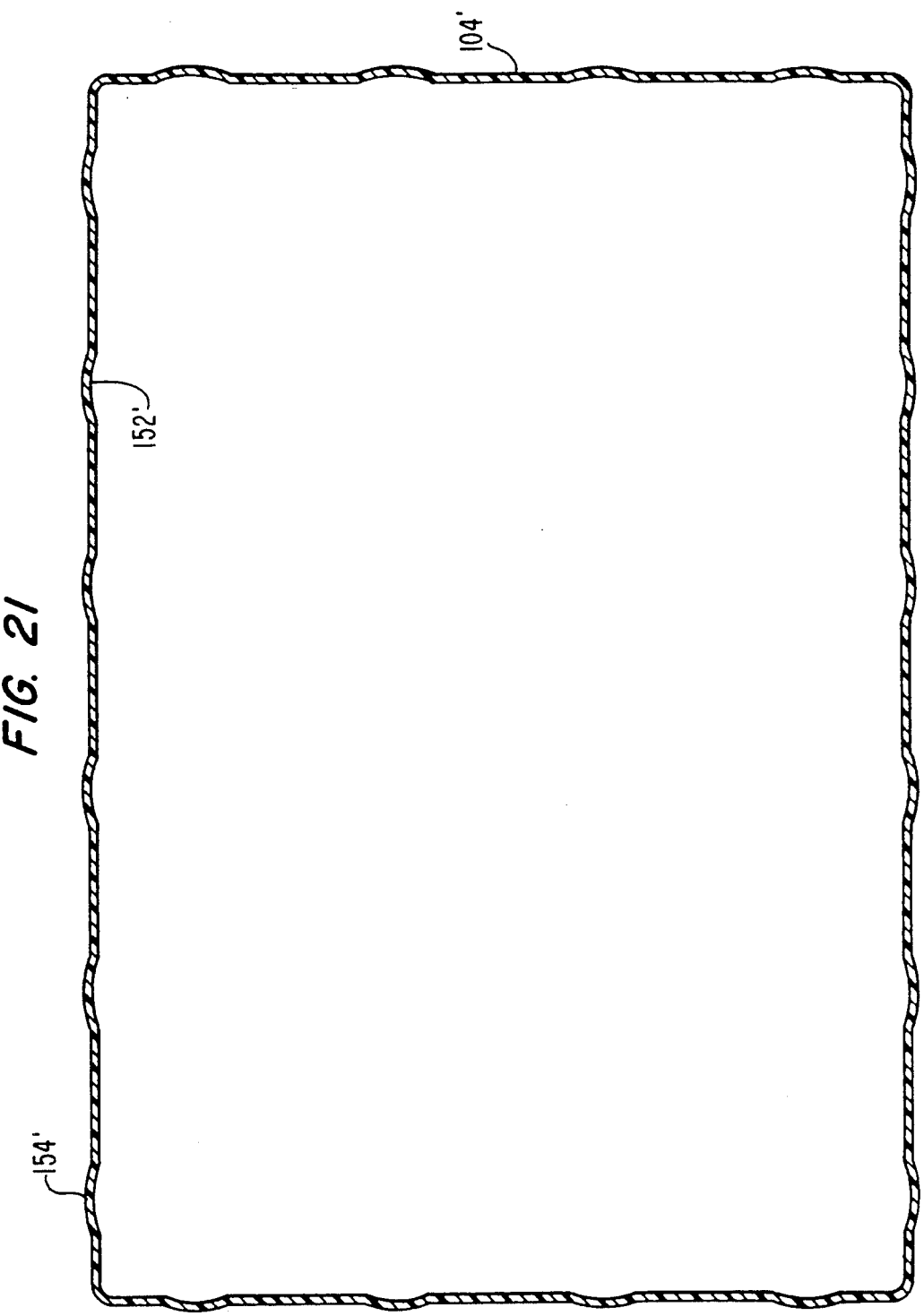

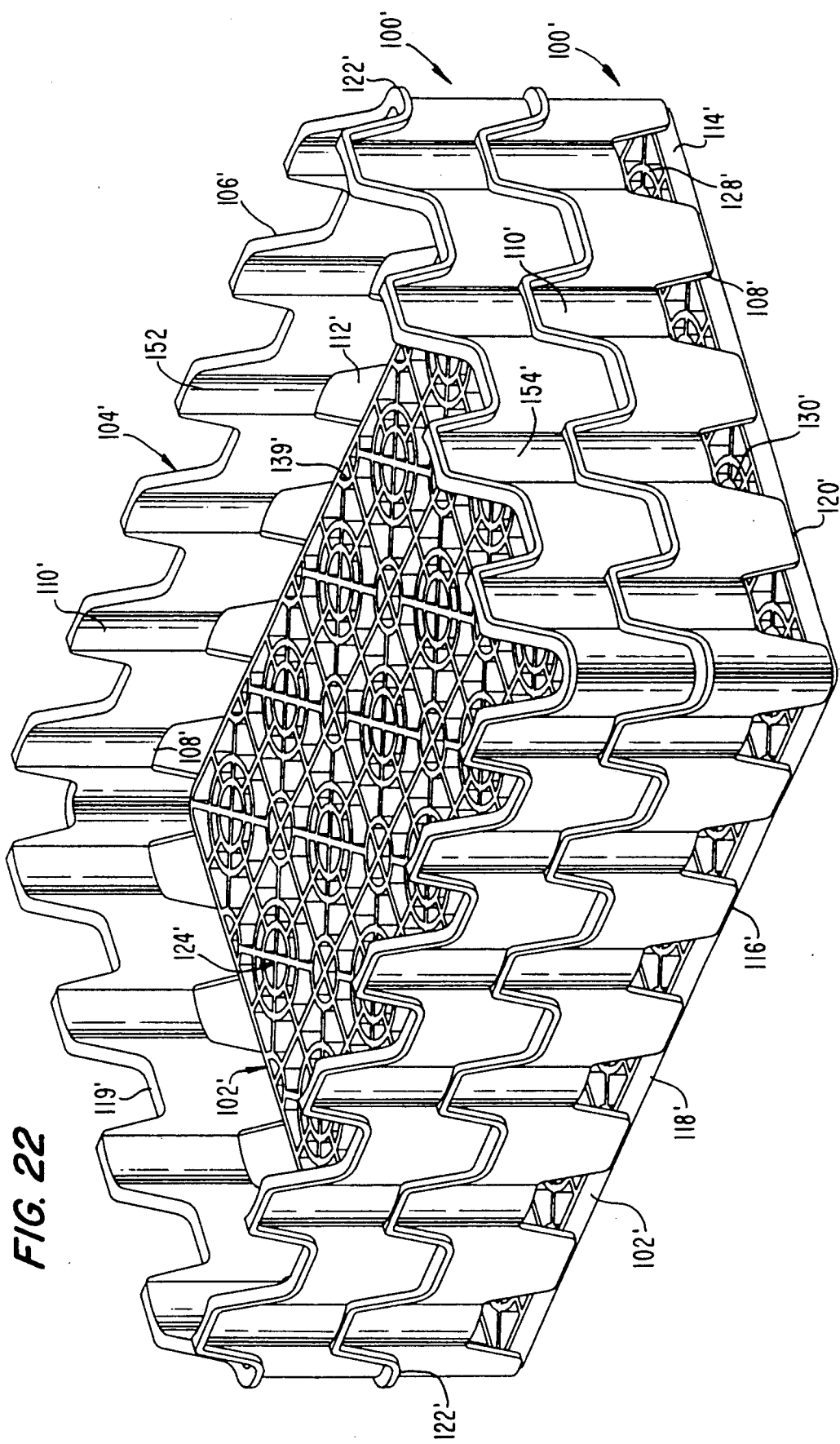

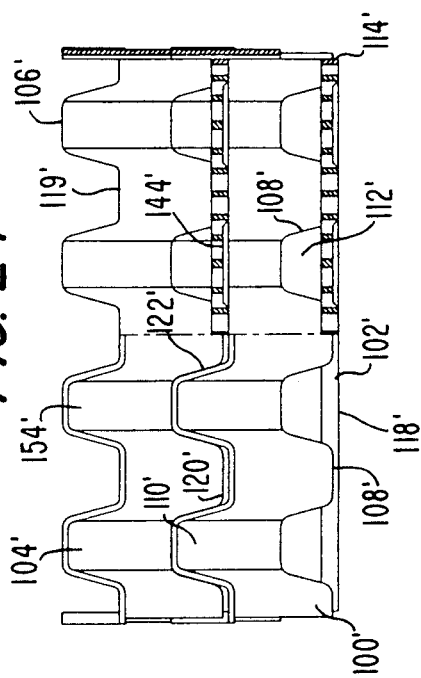
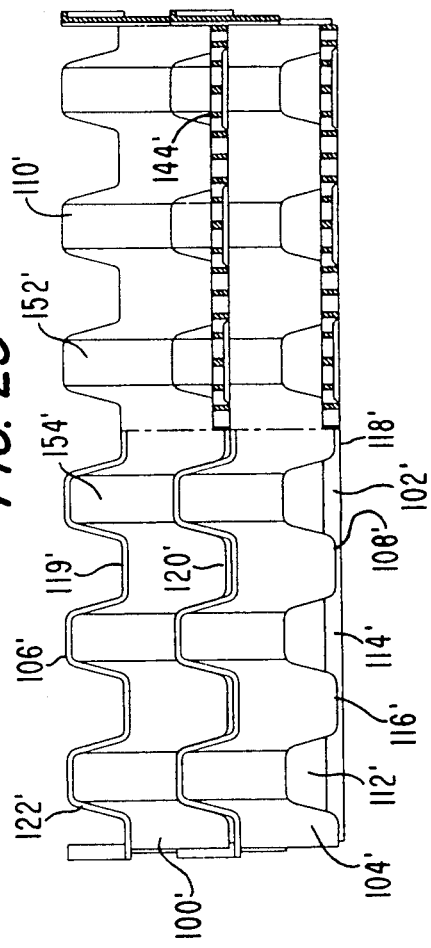

NESTABLE LOW DEPTH TRAY

This is a continuation-in-part of copending applications Ser. No. 07/186,140, filed Apr. 26, 1988, now U.S. Pat. No. 4,899,874, Ser. No. 07/272,039, filed Nov. 15, 1988, now U.S. Pat. No. 4,932,532, and Ser. No. 07/369,598, filed June 21, 1989. The entire contents of each of these applications are hereby incorporated by reference.

BACKGROUND OF THE INVENTION

The present invention relates to reusable low-depth, nestable trays for transporting and storing fluid containers and particularly sixteen-ounce bottles.

Containers, and particularly cans, for soft drinks, beer and other beverages are often stored and transported during the distribution stages thereof in short-walled, cardboard trays or boxes. These cardboard trays are generally not rugged enough, however, for reuse and therefore must be discarded by the retailer at his expense. They are flimsy and can collapse when wet. They are also unattractive and do not permit the full display, merchandising and advertising of the beverage containers held therein. Thus, there has been a need for a returnable and reusable case for storing and transporting beverage containers. This case should be lightweight, easy to manipulate and carry and economically constructed.

An example of a relatively recent, returnable and reusable tray which is particularly adapted for handling twenty-four, twelve-ounce, pull-top aluminum cans, is that disclosed in the above mentioned '039 application. When empty the reusable plastic trays of that application are nestable one within the other so as to occupy less storage space and to be more easily handled. The trays are nestable only to a small extent, perhaps one-quarter of their total height. In other words, each additional tray adds about three-quarters of its total tray height to the stack of empty trays. A large amount of storage space is thus needed for the empty trays, and a stack of trays can be rather tall and cumbersome to handle. Additionally, the sides of that tray are solid around their perimeters, and thus the lower portions of the beverage containers held therein, especially when the loaded trays are stacked one on top of the other, are not exposed. This prevents the stored containers from being readily seen to both determine how full the trays are and also the container brand from the labels to more completely advertise and market these containers. In other words, the tray surrounds the containers held therein and prevents them from being fully displayed.

One design of a stackable low-depth cases, particularly suitable for today's two-liter polyethylene terephthalate (PET) bottles, is that disclosed in the above-mentioned '140 application. For this genre of cases, a plurality of columns project upwardly from the case floor and together with the sidewalls define a plurality of bottle retaining pockets. These columns are hollow to permit empty crates to stack top to bottom. These low-profile crate designs have spaced side columns to provide added strength and yet still expose to some extent the containers therein. This design though requires a certain registration of the empty crates for nesting purposes making the procedure a bit more cumbersome and time consuming than desirable.

Known low-depth crates often do not prevent the containers, and especially sixteen-ounce bottles, from hopping out of them as they are prone to do during shipment. A need has thus arisen for an improved reusable low-depth tray for handling, transporting and displaying sixteen-ounce bottles, as well as two-liter bottles and twelve-ounce cans.

SUMMARY OF THE INVENTION

Accordingly, it is a principal object of the present invention to provide an improved returnable and reusable tray for storing and transporting fluid containers.

Another object is to provide a sturdy, low-depth plastic tray for sixteen-ounce bottles.

A further object is to provide an improved fluid container case whose low-depth side walls do not contact the containers therein during normal use of the case yet still prevent the containers from hopping out of the case during shipment.

A still further object is to provide a low-depth tray design which securely and compactly column stacks when empty, and which has minimum length and width dimensions relative to the number and type of containers therein.

Another object is to provide a low-depth bottle tray which maximizes the display of the stored bottles and their labels with the trays loaded and stacked.

A still further object is to provide a nestable case for beverage containers which case is lightweight, easy to handle, inexpensive to manufacture, and attractive.

Directed to achieving these objects, a low-depth nestable plastic tray for fluid containers, such as sixteen-ounce bottles, is herein disclosed. The tray is formed by integrally molding a sidewall with, about and to the perimeter of an open grid-work support floor. The sidewall has an undulating configuration on its top and bottom edges with alternating projections and depressions. According to one embodiment, the top edge extensions are positioned between the bottles to maximize the bottle label display. Another embodiment positions the extensions directly adjacent the bottles to maximize stability of the bottles in the tray during transport thereof. These undulating configurations allow the bottles in the stacked trays to be more fully displayed as well as to be securely transported.

The projections of the top edge are vertically aligned with the depressions of the bottom edge. Thus, the tray when empty can securely nest on its edges with similar empty trays above and below it. The bottom surface of the support floor is formed with an array of recesses for receiving up thereinto the tops of the bottles in a similar loaded tray beneath it. This prevents sliding when the low-depth trays are loaded and stacked on top of each other.

Other objects and advantages of the present invention will become more apparent to those persons having ordinary skill in the art to which the present invention pertains from the following description taken in conjunction with the accompanying drawings.

BRIEF DESCRIPTION OF THE DRAWINGS

FIG. 8 is a cross-sectional view taken along line 8—8 of FIG. 4 showing the sidewall of the tray in isolation.

FIG. 9 is a perspective view of four trays, which are a slight variation of the tray of FIG. 1, shown empty and column stacked.

FIG. 12 is a side elevational view of two trays of FIG. 1 shown loaded and stacked, with the right half portions thereof being shown in section.

FIG. 13 is an end elevational view similar to that of FIG. 12.

FIG. 17 is a side elevational view of the tray of FIG. 14.

FIG. 18 is an end elevational view of the tray of FIG. 14.

FIG. 21 is a cross-sectional view taken along line 21—21 of FIG. 17.

FIG. 22 is a top perspective view of two trays of FIG. 14 shown empty and column stacked.

FIG. 23 is a side elevational view of the trays, which are a slight variation of the tray of FIG. 22, with the right half portions shown in section.

FIG. 24 is an end elevational view similar to that of FIG. 23.

DETAILED DESCRIPTION OF PREFERRED EMBODIMENTS OF THE INVENTION

Figure 1:
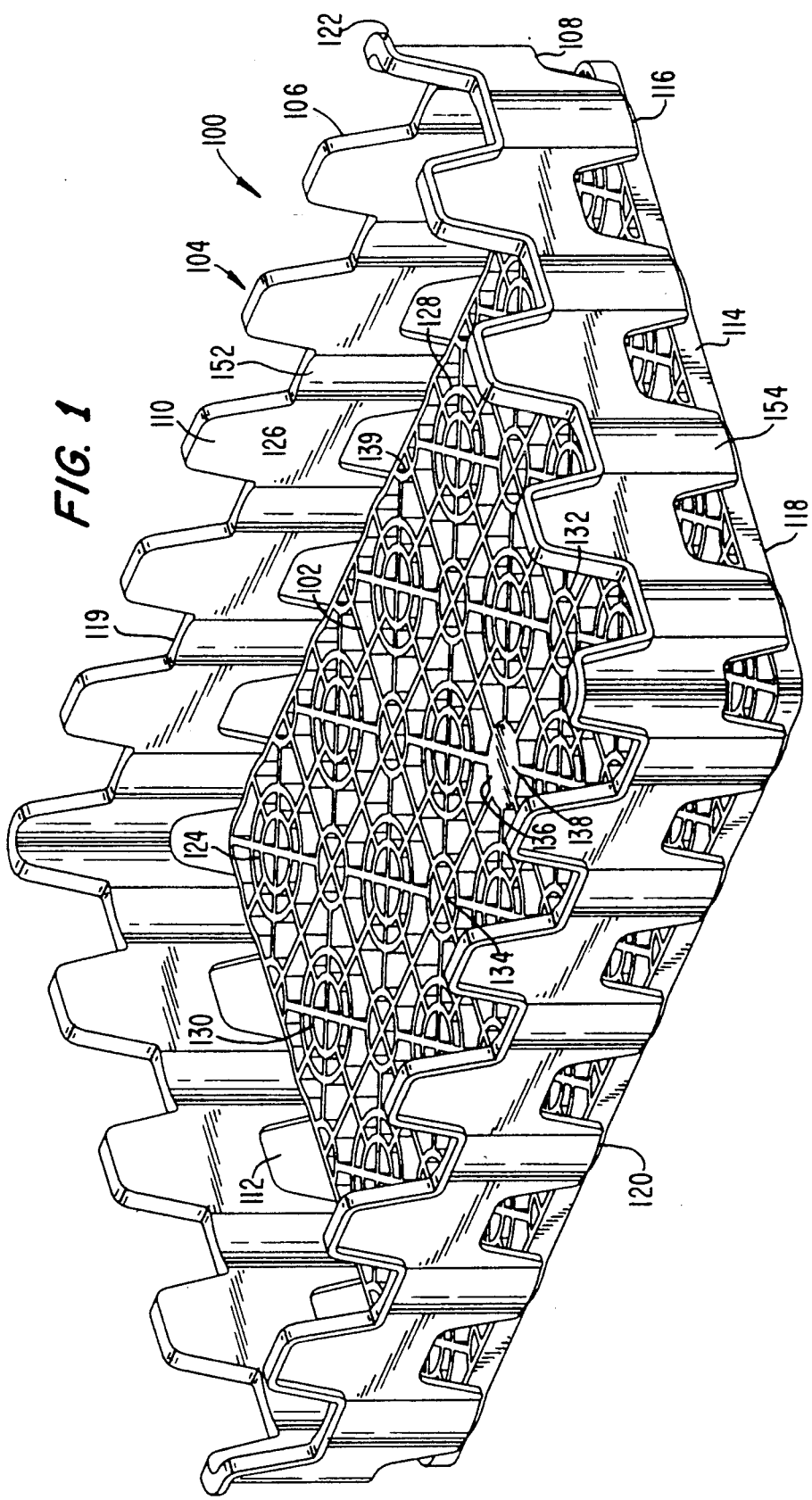
FIG. 1 is a top perspective view of a first nestable tray of the present invention.

Two preferred embodiments of the present nestable tray are illustrated in the drawings. The first is illustrated in FIGS. 1 through 13 and the second in FIGS. 14 through 26. Elements in the second embodiment which correspond to those in the first are designated with like reference numerals followed by a prime (') designation.

Figure 4:
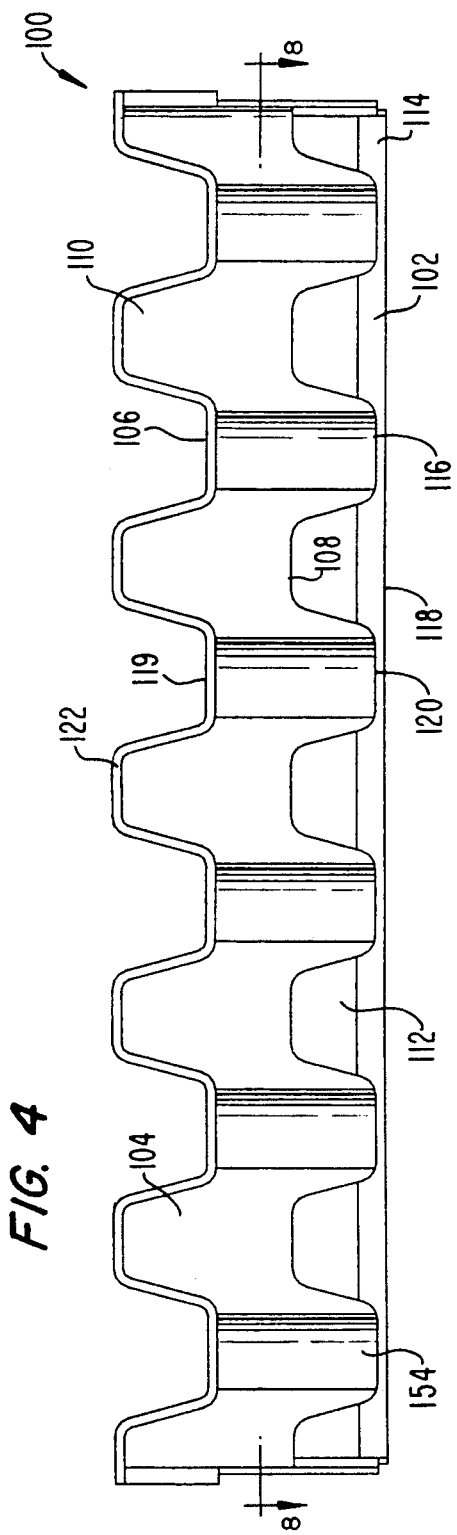
FIG. 4 is a side elevational view of the tray of FIG. 1.
Figure 5:
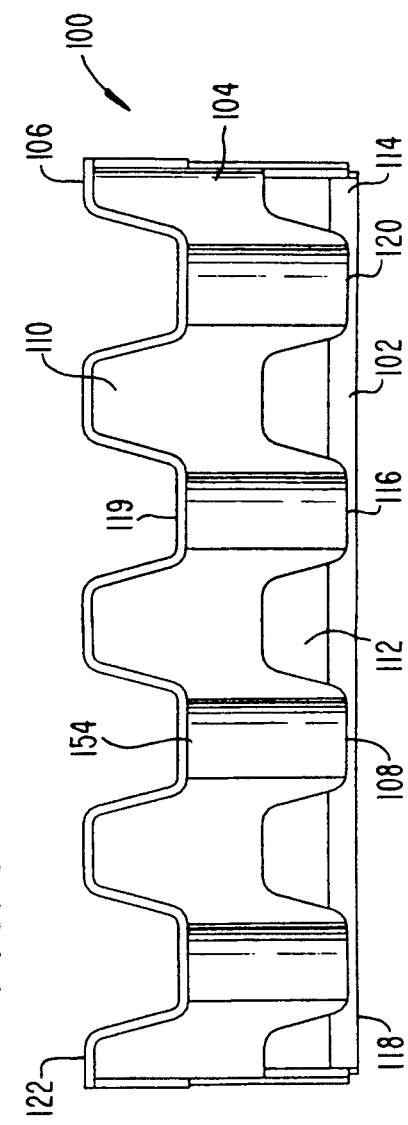
FIG. 5 is an end elevational view of the tray of FIG. 1.

The first nestable tray shown generally at 100 is comprised essentially of two components—a rectangular floor shown generally at 102 and a rectangular sidewall shown generally at 104, both having four rounded corners. Floor 102 and sidewall 104 are integrally molded together out of a plastic such as high density polyethylene (HDPE). The sidewall 104 is formed in a unique configuration wherein both the top and bottom surfaces or edges thereof 106, 108 have an undulating or wavelike formation along their entire lengths. In other words, spaced extension portions 110 are formed along the top surface 106 and cut-out portions 112 are formed along the bottom surface 108. These cut-out portions 112 are disposed directly vertically beneath the corresponding extension portions 110, as can be seen in FIGS. 4 and 5. The extension and cut-out portions 110, 112 are similarly shaped and configured and preferably are in the shape of trapezoids. The sidewall 104 is nearly perfectly vertically disposed and has only a slight angle sufficient to allow the tray 100 to be removed from its mold (not shown). The sidewall 104 is secured to the outside perimeter 114 of the floor 102, and the lowermost edges 116 of the bottom surface 108 (between the cut-out portions 112) are positioned a slight distance above the bottom edge 118 of the floor 102, as can be seen in FIGS. 4 and 5, for example.

Figure 11:
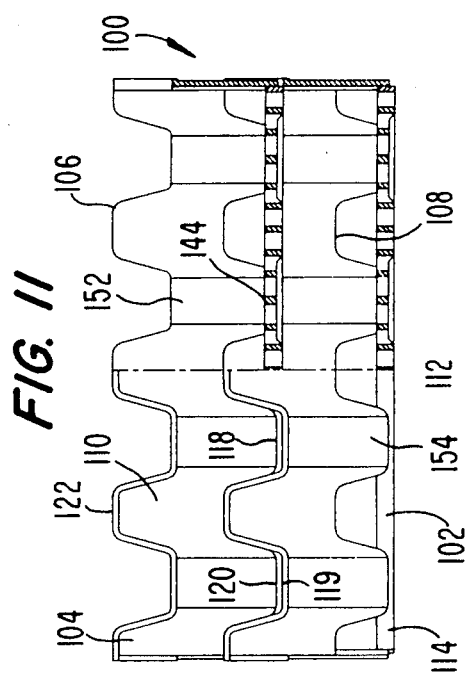
FIG. 11 is an end view similar to that of FIG. 10.
Figure 10:
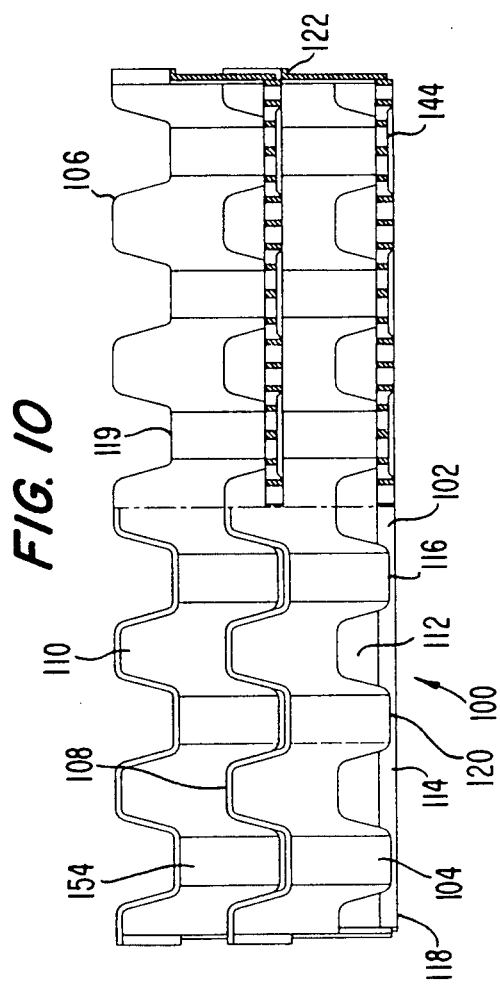
FIG. 10 is a side elevational view of two empty nested trays of FIG. 1 with the right halves thereof being shown in section.
Figure 14:
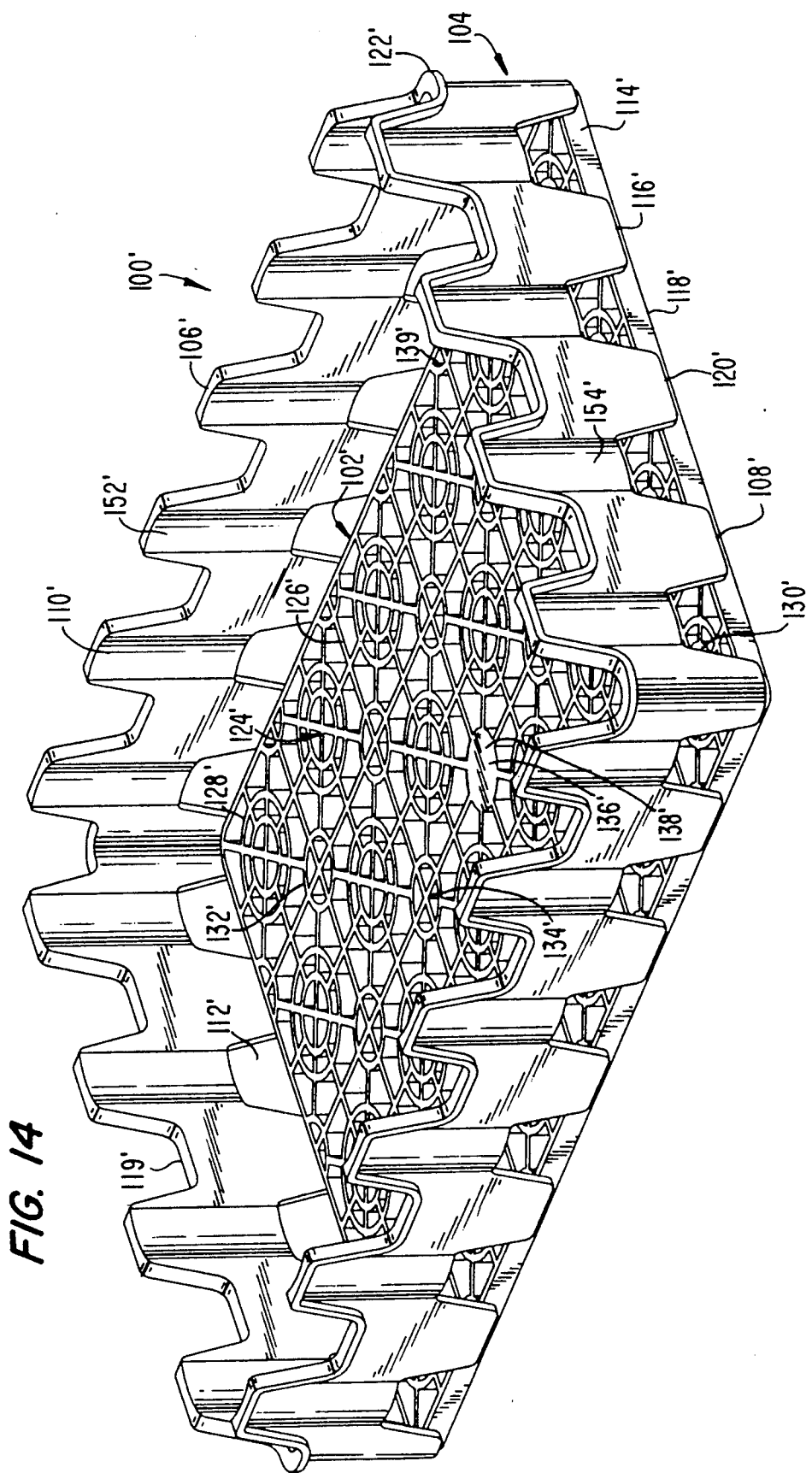
FIG. 14 is a top perspective view of a second nestable tray of the present invention.

Referring now to FIGS. 9-11, this undulating configuration allows the tray 100 when empty to nest within another similar tray 100 such that the extension portions 110 fit in the corresponding cut-out portions 112 of the trays on top of them. The portions 119, 120 (or 116), respectively, between the extension portions 110 on the top surface 106 and between the cut-out portions 112 on the bottom surface 108 nearly mate with the adjacent tray, as can be seen for example in FIGS. 10 and 11. When these surfaces mate the outwardly projecting lip 122 of the top surface 106 engages most of the bottom edge of the bottom surface 108. The trays 100 thereby can ship empty in a compact and secure column stack.

Figure 2:
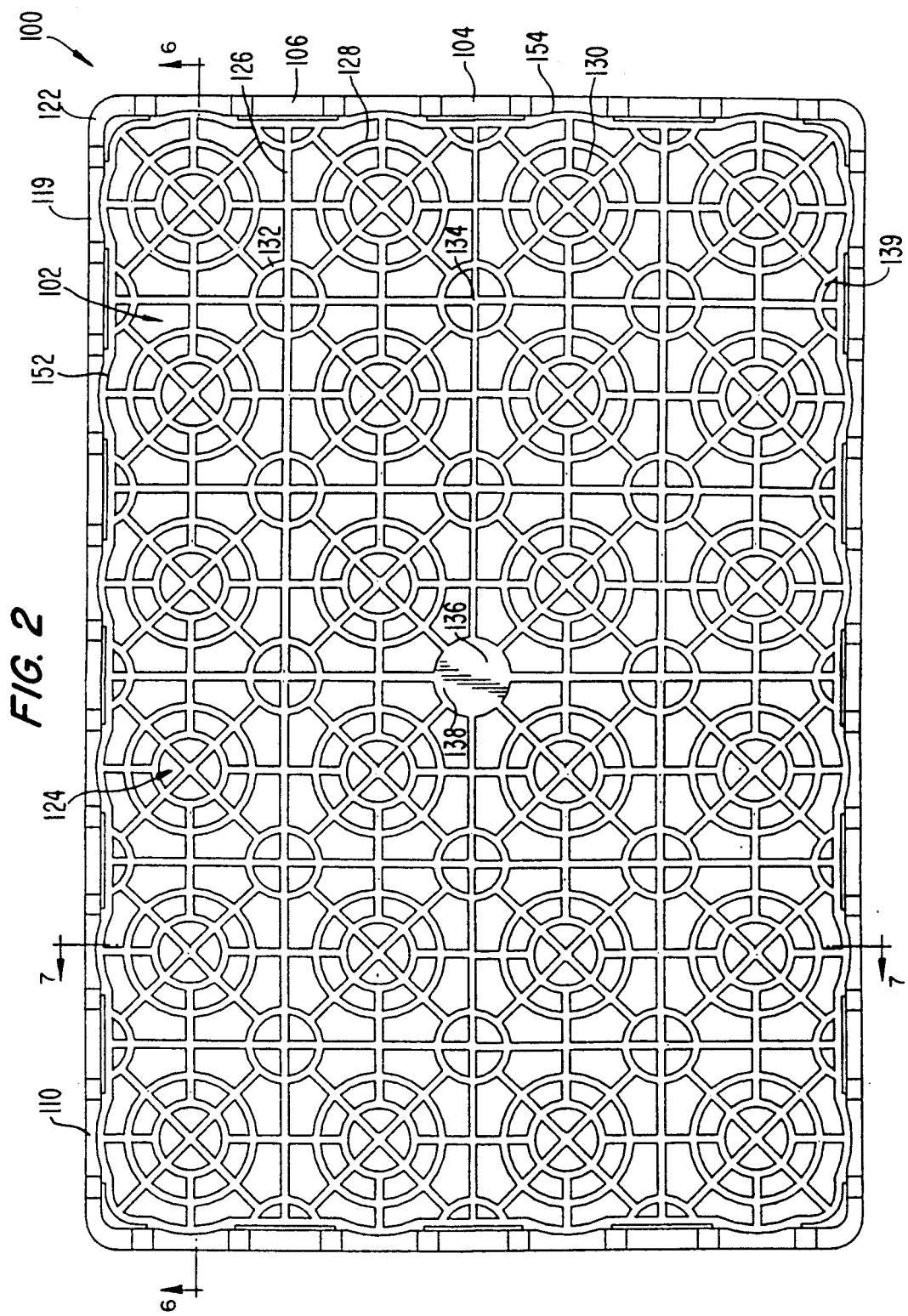
FIG. 2 is a top plan view of the tray of FIG. 1.
Figure 3:
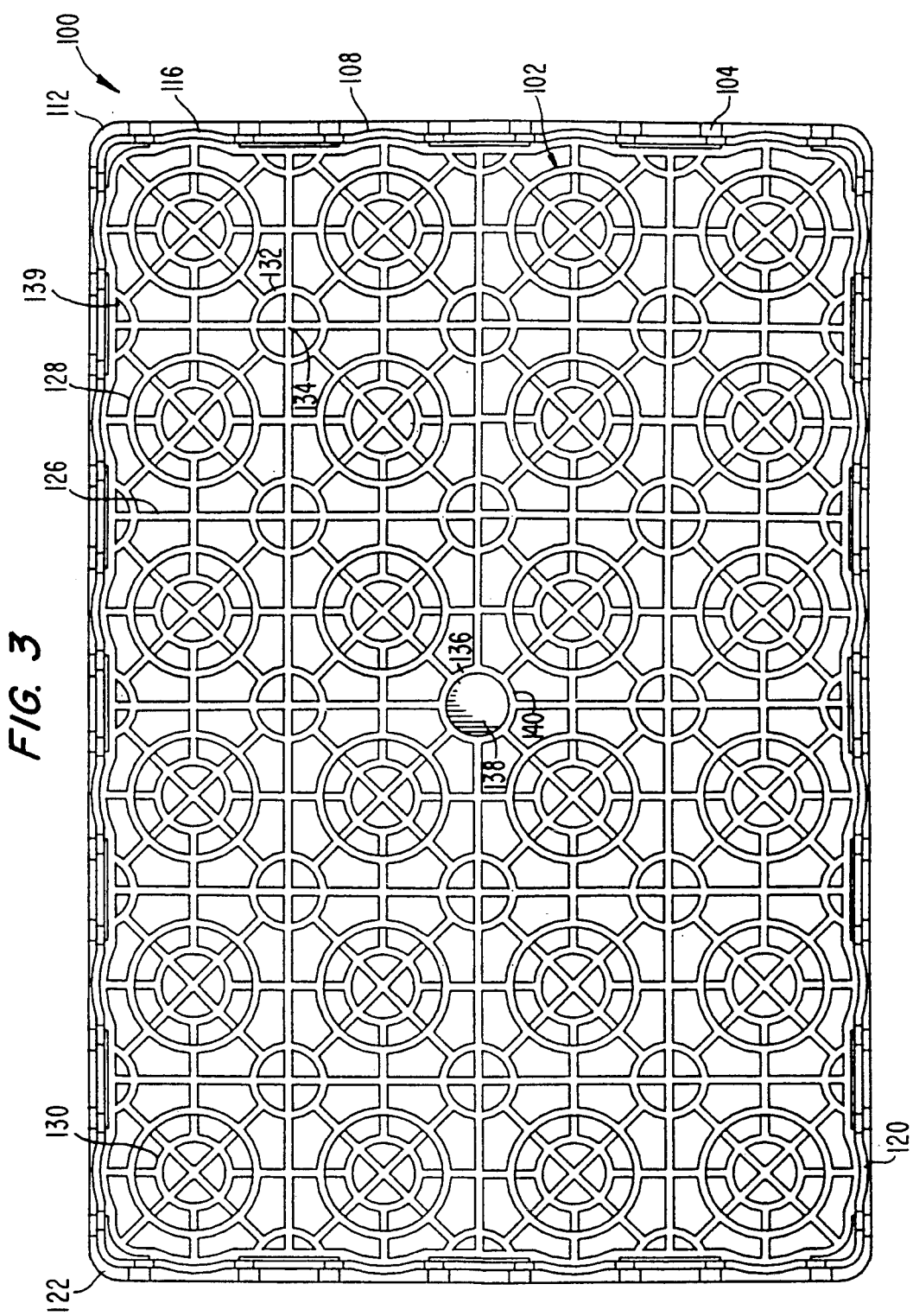
FIG. 3 is a bottom plan view of the tray of FIG. 1.

The floor 102 is formed in an open grid-work design as shown for example in FIGS. 2 and 3. The design is preferably in a four-by-six array of repeating patterns each providing a fluid container support area such as shown generally at 124. Each pattern can be defined by a square 126 with a pair of concentric circles 128, 130 inside thereof. A circle member 132 encircles each of the intersections 134 of four adjacent squares. The center 136 of these circle members 132 comprises a solid surface 138 (FIG. 2) on the top with a peripheral rim 140 (FIG. 3) on the bottom because it creates a better area for injecting plastic. Center circle member 132 can have alternatively a cross-rib configuration similar to that of the other circle members 132, as shown in FIG.(S) 9 (and 22). Half circles 139 engage the floor perimeter at adjacent squares.

Figure 6:
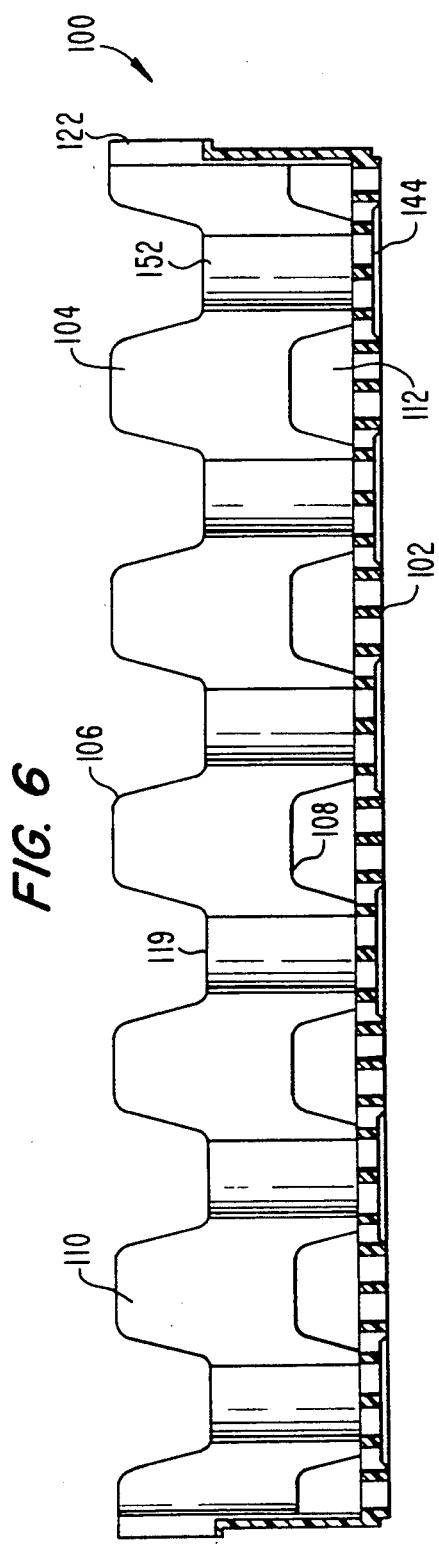
FIG. 6 is a cross-sectional view taken along line 6—6 of FIG. 2.
Figure 7:
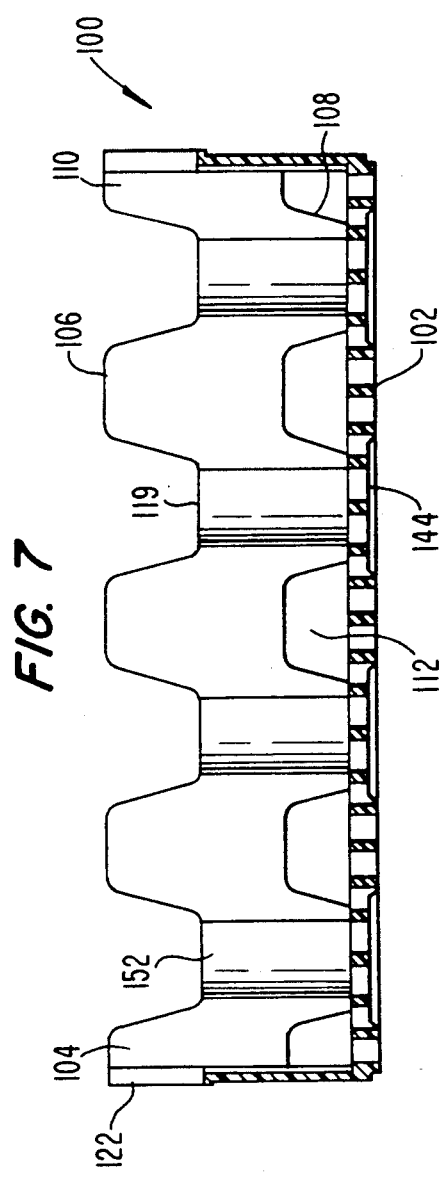
FIG. 7 is a cross-sectional view taken along line 7—7 of FIG. 2.

Although illustrated as a flat surface, the top surface of the floor 102 can be formed with small depressions (not shown) corresponding to the locations and configurations of the bottoms of the containers (bottles) to be supported at each of the support areas 124. The bottom surface of the floor 102, however, has upwardly recessed areas 144 centered at each support area 124, as illustrated in FIGS. 6 and 7. These recessed areas 144 are configured to receive up into them the tops of caps 148 of bottles 150 in a lower tray as depicted in the right half portions of FIGS. 12 and 13. This helps retain the loaded trays 100 in a stacked arrangement without free sliding along the tops of the bottles 150 in the lower trays. It does not, however, lock the loaded trays 100 together such that they cannot be easily lifted off of each other.

The inside surface of the sidewall 104 is peridically recessed out a slight distance with upright cylinder shapes or surfaces 152, as can be seen in FIG. 1, at generally the tangent points of the bottles 150 or other containers when supported at each of the support areas 124. These cylindrical surfaces 152 correspond to the sides of the bottles 150 for permitting the bottles to contact the insides of the sidewall 104 during transport. Under stable conditions though the bottles 150 do not contact the extension portions 110. The extension portions 110, however, do give the tray 100 a taller effective height and prevent the bottles 150 from hopping out of the trays as they are prone to do when transported in prior art low-profile trays. The sidewall 104 through its cross-section, with the exception of the upper lip 122, is of a uniform thickness, and thus the outer wall surface projects out cylindrically at the areas 154 corresponding to the inner wall cylindrical surfaces 152, as can be seen in FIG(S). 8 (and 21).

The extension portions 110, and thus the cut-out portions 112, of the tray 100 of the first embodiment are positioned between the bottles 150, that is, between the bottle support areas 124. This provides for a maximum display of the labels of the bottles 150 as can be understood from the left half portions of FIGS. 12 and 13. Alternatively, the extension portions 110 can be positioned directly on the bottles 150, that is centered on the bottle support areas 124, and thus, corresponding to the cylindrical surfaces 152 as shown in the second embodiment of tray 100' of FIGS. 14–26. This alternative design gives maximum stability to the bottles 150' by contacting them during shipment at the highest points of the tray 100'. Some label display is sacrificed, however, in this alternative design.

Figure 15:
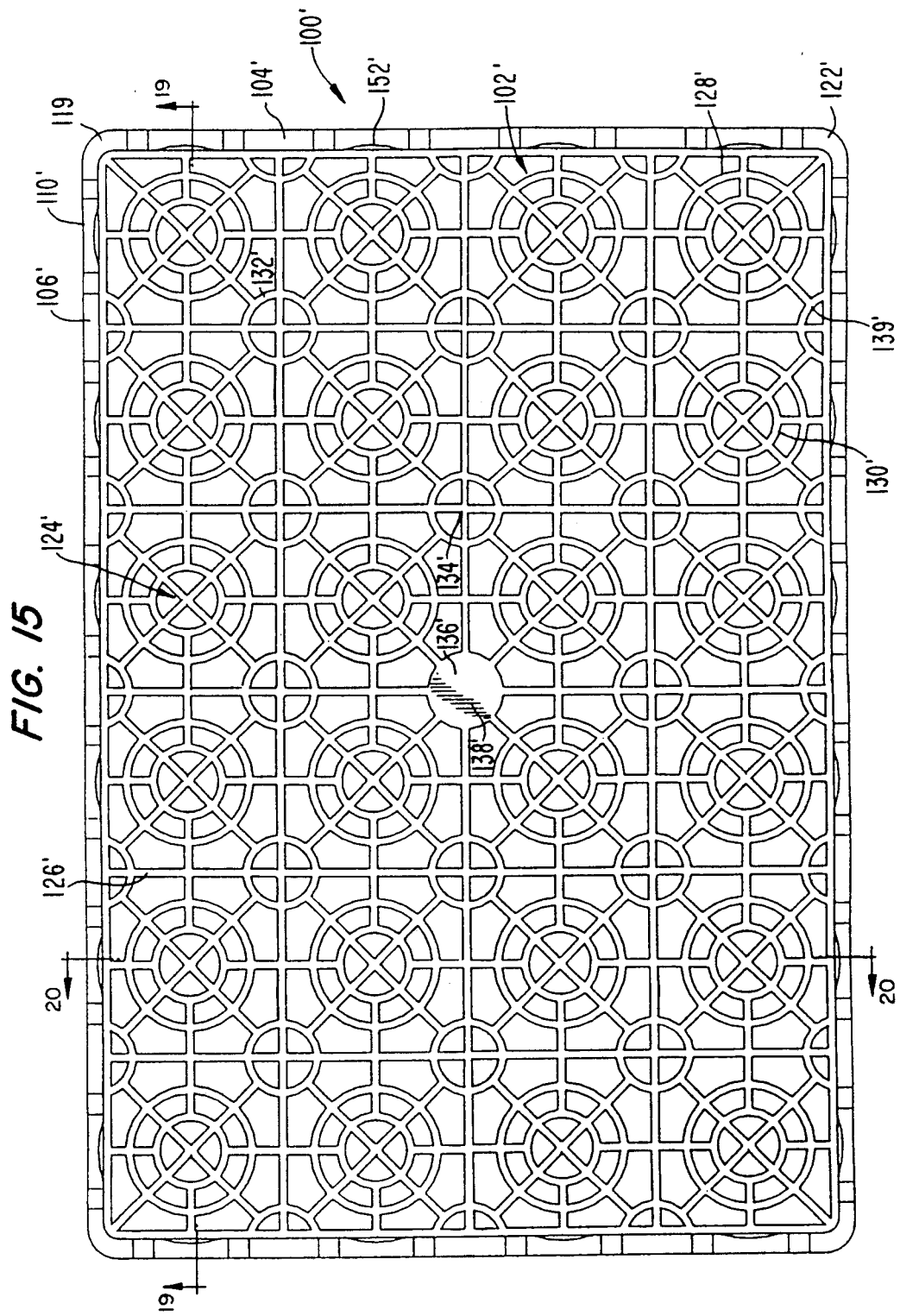
FIG. 15 is a top plan view of the tray of FIG. 14.
Figure 16:
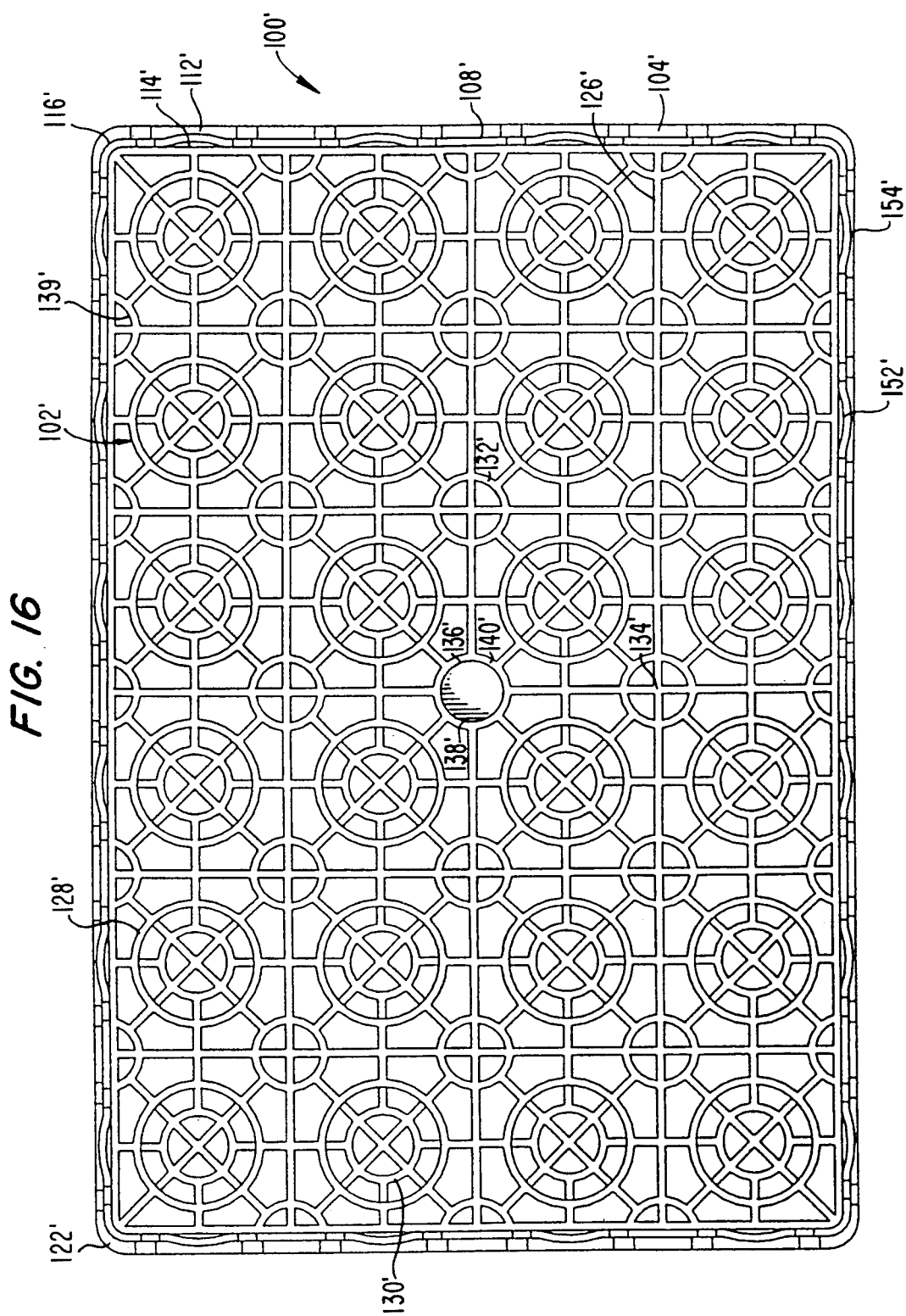
FIG. 16 is a bottom plan view of the tray of FIG. 14.
Figure 19:
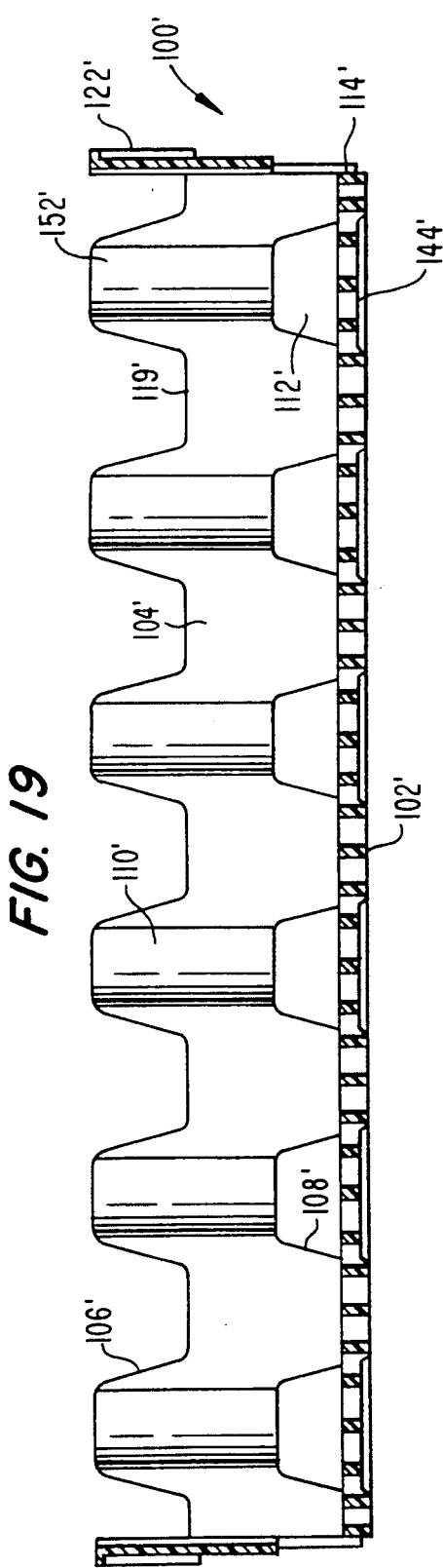
FIG. 19 is a cross-sectional view taken along line 19—19 of FIG. 15.
Figure 20:
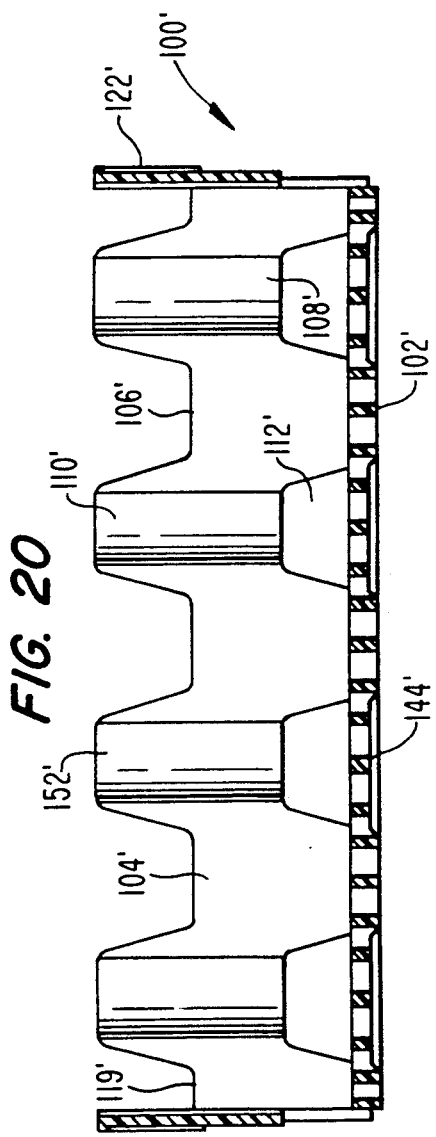
FIG. 20 is a cross-sectional view taken along line 20—20 of FIG. 15.
Figure 26:
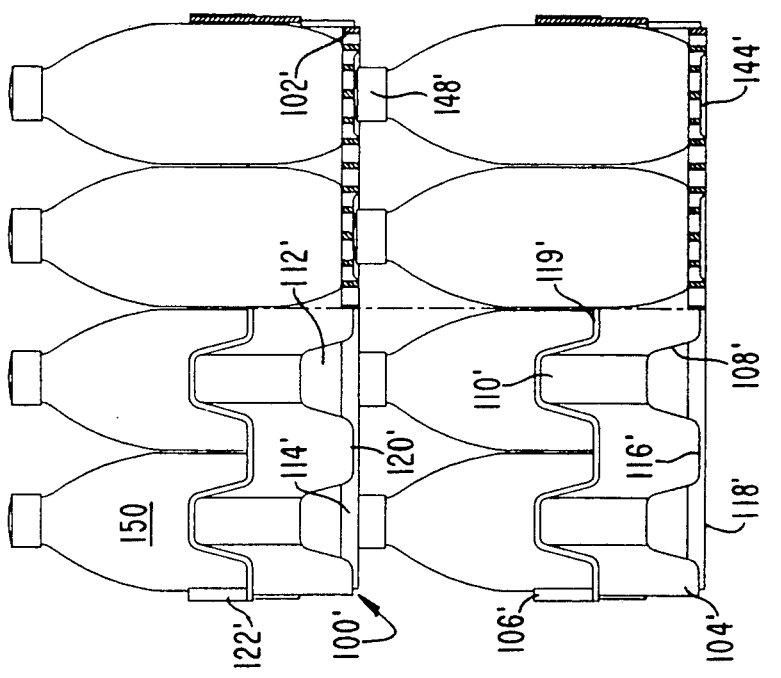
FIG. 26 is an end elevational view similar to that of FIG. 25.
Figure 25:
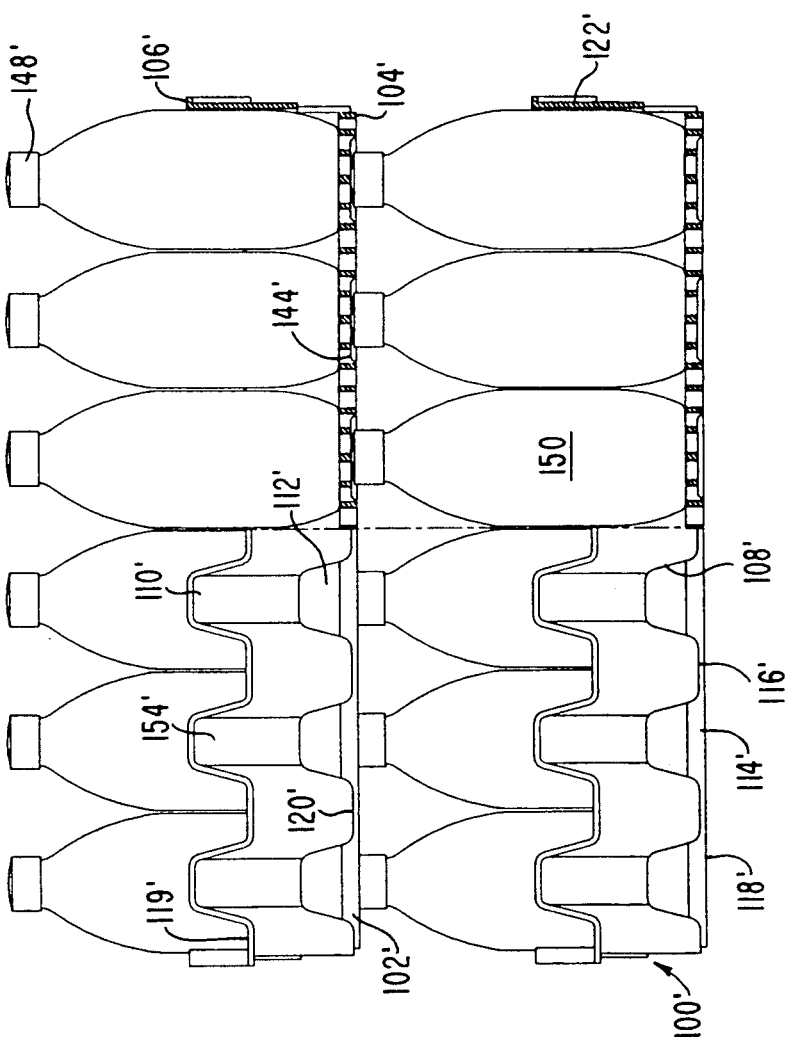
FIG. 25 is a side elevational view of two trays of FIG. 14 loaded and stacked, with the right half portions shown in section.

Preferred outer dimensions of the trays 100 and 100' as shown in FIGS. 2 and 15 are 18.500 inches by 12.334 inches and a height as seen in FIGS. 4 and 5 of 3.625 inches. The trapezoidal cut-outs and extension portions 112, 110 can have heights of 1.250 inches and define angles of seventy-five degrees and zero minutes. Two stacked trays as depicted in FIG. 22 have a total nesting height of only 2.375 inches. In other words, each additional tray 100 or 100' adds only an additional height of 2.375 inches to the column stack of trays, thereby providing a more compact stack. The internal dimensions of the nestable trays 100 or 100' are 18.000 inches by 12.000 inches by 3.250 inches, and each square 126 or 126' is 3.00 inch square. It is of course within the scope of this invention to vary the dimensions as needed to accommodate different requirements.

Although depicted as being especially suitable for today's conventional sixteen-ounce bottles 150, it is within the scope of this invention to adapt the designs of trays 100 and 100' for other types of containers such as two-liter bottles or twelve-ounce cans. Also, although preferably configured to hold twenty-four containers in a four-by-six array, the trays 100 and 100' can be sized differently to hold different numbers of containers and/or to hold them in differently-configured arrays.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

It is claimed:

1. A nestable tray comprising:
   a floor having a top surface, a bottom surface, and a floor perimeter, said top surface having a plurality of fluid container support areas; and
   a sidewall secured to said floor perimeter and extending up from said floor, said sidewall having elongated top and bottom surfaces, said top surface having a plurality of spaced raised portions, said bottom surface having a plurality of spaced raised portions corresponding to those of said top surface such that when said tray, when empty, is stacked on top of a similar empty tray said bottom surface mates with the top surface of the similar tray and said tray and the similar tray thereby nest relative to one another;
   wherein said raised portions of said top surface are disposed directly above said raised portions of said bottom surface; and
   wherein said sidewall comprises a plurality of serially-arranged panels, alternating ones of which are raised relative to said floor and whose upper and lower panel surfaces define said raised portions of said top and bottom surfaces, respectively.

2. The nestable tray of claim 1 further comprising an outwardly projecting lip along the length of said upper surface.

3. The nestable tray of claim 1 wherein said sidewall includes an outwardly projecting lip extending the length of said upper surface.

4. The nestable tray of claim 1 wherein said upper surface defines between said raised portions thereof open spaces through which fluid containers supported on said upper surface can be seen.

5. The nestable tray of claim 1 wherein said raised portions of said bottom surface are spaced a distance above said upper surface of said floor thereby defining openings through which fluid containers supported on said floor upper surface can be seen.

6. The nestable tray of claim 1 wherein said floor comprises an open grid-work configuration.

7. The nestable tray of claim 6 wherein said open grid-work configuration includes at least one circular member for each said fluid container support area.

8. The nestable tray of claim 1 wherein said sidewall has a plurality of spaced upright, outwardly-disposed cylindrical surfaces adjacent to each said fluid container support area adjacent said floor perimeter and corresponding to the cylindrical body surfaces of the fluid containers to be supported on said fluid container support areas.

9. The nestable tray of claim 8 wherein said floor perimeter has a square configuration with four rounded corners, and said sidewall has four rounded corners above said floor corners.

10. The nestable tray of claim 1 wherein said bottom surface has a plurality of receiving areas for receiving thereon the tops of similar fluid containers in a layer in a similar tray beneath said floor.

11. The nestable tray of claim 1 wherein said floor and said sidewall are integrally formed.

12. The nestable tray of claim 11 wherein said floor and said sidewall are molded of plastic.

13. The nestable tray of claim 1 wherein said raised portions of said top and bottom surfaces each define a trapezoid.

14. The nestable tray of claim 13 wherein said trapezoids of said top and bottom surfaces are similarly sized and configured.

15. The nestable tray of claim 1 wherein each said fluid container support area is configured to support thereon a sixteen-ounce bottle and said sidewall have the heights of said raised portions of said upper surface extending about two-fifths of the height of sixteen-ounce bottles on said support areas.

16. The nestable tray of claim 15 wherein said sidewall has a total height of 3.625 inches.

17. The nestable tray of claim 1 wherein said floor is comprised of a plurality of interconnected straight and arcuate plastic ribs.

18. The nestable tray of claim 1 wherein said sidewall defines a square with rounded corners.

19. The nestable tray of claim 18 wherein said one of raised portions of said upper surface is positioned at each of said rounded corners.

20. The nestable tray of claim 18 wherein each of said raised portions is spaced from each of said rounded corners.

21. The nestable tray of claim 1 wherein said sidewall has its entire inner and outer surfaces being vertically disposed.

22. The nestable tray of claim 1 wherein said side wall at lowest ends thereof is secured to the side surfaces of said floor perimeter.

23. The nestable tray of claim 1 wherein said bottom surfaces of said sidewall have the lowermost edges thereof spaced above the perimeter edge of said bottom surface.

24. The nestable tray of claim 1 wherein said sidewall defines a continuous structure encircling the entire said floor perimeter and enclosing an area therein above said top surface, said area being open across the entire expanse of said top surface.

25. The nestable tray of claim 1 wherein said raised portions of said top surface are positioned directly out from each said fluid container support area along said floor perimeter.

26. The nestable tray of claim 1 wherein said raised portions of said top surface are positioned directly between said fluid container support areas along said floor perimeter.

27. The nestable tray of claim 19 wherein said bottom surface is recessed upward at each said receiving area and configured to receive thereinto each of the tops of similar fluid containers in a layer beneath.

28. The nestable tray of claim 1 wherein said sidewall is free standing and unsupported along the entire height thereof above said floor top surface.

29. The nestable tray of claim 1 further comprising a separate fluid container supported on each said support area, each said fluid container extending up above said top surface spaced raised portions such that said sidewall defines a lowdepth sidewall construction.

30. The nestable tray of claim 29 wherein portions of said fluid containers are laterally visible between adjacent said top surface raised portions and between adjacent said bottom surface raised portions.

31. The nestable tray of claim 1 wherein said floor perimeter has a straight-sided rectangular configuration.

32. A nestable low-depth tray, said tray comprising:
a rectangular, fluid container support base having a rectangular straight-sided outer base perimeter edge; and
low-depth sidewall structure secured to and about said perimeter edge, outside of said support base and extending up from said support base, said sidewall structure having spaced upward extensions and spaced bottom cut-out portions extending above a top surface of said support base;
wherein when said tray is empty and is nesting beneath a similar empty tray on top of it, said extensions mate into the corresponding cut-out portions of the similar empty tray; and
wherein said sidewall structure has a plurality of spaced upright, outwardly-disposed cylindrical surfaces corresponding to cylindrical body surfaces of fluid containers supported on said support base and generally adjacent to said perimeter edge.

33. A nestable low-depth tray, said tray comprising:
a floor having a top surface, a bottom surface, and a floor perimeter, said top surface having a plurality of fluid container support areas; and
a free standing low-depth sidewall secured to said floor perimeter and extending up from said floor, said sidewall having elongated top and bottom edges, said top and bottom edges both having undulating configurations with alternating projections and depressions, said depressions of said bottom edge being vertically aligned with said projections of said top edge;
wherein said sidewall has a plurality of spaced upright, outwardly-disposed cylindrical surfaces corresponding to cylindrical body surfaces of fluid containers supported on the support areas generally adjacent to said floor perimeter.

34. A nestable tray comprising:
a floor having a top surface, a bottom surface, and a floor perimeter, said top surface having a plurality of fluid container support areas;
a sidewall secured to said floor perimeter and extending up from said floor, said sidewall having elongated top and bottom surfaces, said top surface having a plurality of spaced raised portions, said bottom surface having a plurality of spaced raised portions corresponding to those of said top surface such that when said tray, when empty, is stacked on top of a similar empty tray said bottom surface mates with the top surface of the similar tray and said tray and the similar tray thereby nest relative to one another;
wherein said sidewall has a plurality of spaced upright, outwardly-disposed cylindrical surfaces adjacent to each said fluid container support area adjacent said floor perimeter and corresponding to the cylindrical body surfaces of the fluid containers to be supported on said fluid container support areas.

35. The nestable tray of claim 34 wherein said bottom surface has a plurality of receiving areas for receiving thereon the tops of similar fluid containers in a layer in a similar tray beneath said floor.

* * * * *